(12) United States Patent
Hoegele et al.

(10) Patent No.: US 10,330,927 B2
(45) Date of Patent: Jun. 25, 2019

(54) OPTICAL SYSTEM AND SURGICAL MICROSCOPE

(71) Applicant: Carl Zeiss Meditec AG, Jena (DE)

(72) Inventors: Artur Hoegele, Oberkochen (DE); Thomas Nobis, Jena (DE)

(73) Assignee: Carl Zeiss Meditec AG, Jena (DE)

( * ) Notice: Subject to any disclaimer, the term of this patent is extended or adjusted under 35 U.S.C. 154(b) by 228 days.

(21) Appl. No.: 15/061,904

(22) Filed: Mar. 4, 2016

(65) Prior Publication Data
US 2016/0259163 A1    Sep. 8, 2016

(30) Foreign Application Priority Data

Mar. 4, 2015 (DE) .......................... 10 2015 203 844

(51) Int. Cl.
| G02B 9/16 | (2006.01) |
| H04N 9/04 | (2006.01) |
| G02B 13/14 | (2006.01) |
| G02B 21/00 | (2006.01) |
| G02B 21/02 | (2006.01) |
| G02B 21/16 | (2006.01) |
| G02B 21/22 | (2006.01) |

(Continued)

(52) U.S. Cl.
CPC ........... *G02B 27/0025* (2013.01); *G02B 9/16* (2013.01); *G02B 13/146* (2013.01); *G02B 21/0012* (2013.01); *G02B 21/025* (2013.01); *G02B 21/16* (2013.01); *G02B 21/361* (2013.01); *G02B 27/0062* (2013.01); *H04N 9/045* (2013.01); *G02B 21/22* (2013.01)

(58) Field of Classification Search
USPC ........................................................ 348/79
See application file for complete search history.

(56) References Cited

U.S. PATENT DOCUMENTS 4,786,155 A    11/1988  Fantone et al.
5,859,700 A *   1/1999  Yang ..................... G01J 3/2823
                                                         356/300

(Continued)

FOREIGN PATENT DOCUMENTS

| DE | 10 2006 006 014 A1 | 9/2007 |
| EP | 2707505 | 3/2014 |
| WO | 2012152747 | 11/2012 |

OTHER PUBLICATIONS

S-BSM16(Datasheet S-BSM16, "Table Deviation of Relative Dispersions from "Normal"", Jan. 5, 2004, XP055284216, Ohara Corp., one sheet. http://www.oharacorp.com/pdf/esbsm16.pdf).*

(Continued)

*Primary Examiner* — Behrooz M Senfi
*Assistant Examiner* — Ana Picon-Feliciano
(74) *Attorney, Agent, or Firm* — Walter Ottesen, P.A.

(57) ABSTRACT

An optical system images an object region with an optical beam path in an image plane of an image acquisition system. The optical system includes a first optical assembly through which the optical beam path passes and a second optical assembly arranged in the optical beam path on the side of the first optical assembly facing away from the object region. The second optical assembly is a system at least partly compensating longitudinal chromatic aberrations of the first optical assembly occurring in the wavelength range 625 nm≤λ≤850 nm of the light.

12 Claims, 4 Drawing Sheets

(51) Int. Cl.
*G02B 21/36* (2006.01)
*G02B 27/00* (2006.01)

(56) References Cited

U.S. PATENT DOCUMENTS

| | | | | |
|---|---|---|---|---|
| 5,991,090 | A * | 11/1999 | Strahle | G02B 15/173 |
| | | | | 359/376 |
| 7,864,438 | B2 | 1/2011 | Nakayama | |
| 7,933,066 | B2 | 4/2011 | Steffen et al. | |
| 8,154,797 | B2 | 4/2012 | Steffen et al. | |
| 8,330,087 | B2 | 12/2012 | Domenicali | |
| 8,659,651 | B2 | 2/2014 | Jess et al. | |
| 9,110,301 | B2 | 8/2015 | Lippert et al. | |
| 9,951,388 | B2 | 4/2018 | Demichelis et al. | |
| 2008/0225409 | A1* | 9/2008 | Alexay | G02B 1/02 |
| | | | | 359/718 |
| 2009/0096914 | A1* | 4/2009 | Domenicali | G01J 3/2803 |
| | | | | 348/345 |
| 2010/0172029 | A1* | 7/2010 | Nakayama | G02B 1/00 |
| | | | | 359/646 |
| 2010/0182418 | A1* | 7/2010 | Jess | G02B 21/0012 |
| | | | | 348/79 |
| 2015/0323774 | A1 | 11/2015 | Lippert et al. | |
| 2018/0291464 | A1 | 10/2018 | Demichelis et al. | |

OTHER PUBLICATIONS

S-NBH5 (Datasheet S-NBH 5, "Table Deviation of Relative Dispersions from "Normal"", Feb. 1, 2006, XP055284224, Ohara Inc., one sheet. https://www.oharacorp.com/pdf/esnbh05.pdf).*

Jedamzik, R., "Color correction in optical systems or why optical design needs fluoro-phosphate glasses", copyright Schott AG, XP055283941, May 31, 2014, pp. 1 to 25.

Datasheet S-BSM16, "Table Deviation of Relative Dispersions from "Normal"", Jan. 5, 2004, XP055284216, Ohara Corp., one sheet http://www.oharacorp.com/pdf/esbsm16.pdf.

Datasheet S-NBH 5, "Table Deviation of Relative Dispersions from "Normal"", Feb. 1, 2006, XP055284224, Ohara Inc., one sheet http://www.ohara-inc.eo.jp/en/product/optical/dl/data/esnbh05.pdf.

* cited by examiner

OPTICAL SYSTEM AND SURGICAL MICROSCOPE

CROSS REFERENCE TO RELATED APPLICATION

This application claims priority of German patent application no. 10 2015 203 844.0, filed Mar. 4, 2015, the entire content of which is incorporated herein by reference.

FIELD OF THE INVENTION

The invention relates to an optics system for imaging an object region with an optical beam path in an image plane of an image acquisition system, with a first optical assembly, through which the optical beam path passes, and with a second optical assembly arranged in the optical beam path on the side of the first optical assembly facing away from the object region. Moreover, the invention relates to a surgical microscope with such an optics system.

BACKGROUND OF THE INVENTION

In the present case, a surgical microscope is understood to mean a system with a microscope unit, preferably embodied as a stereo microscope, which is received at a stand and which enables an observing person to observe an operating region with magnification. The microscope unit can be configured for visualizing the operating region with an optical observation beam path. However, it is also possible to provide a microscope unit which brings digitally acquired images to the display for an observing person. An example of a surgical microscope within the meaning of the invention is the OPMI® Pentem® system, manufactured and distributed by Carl Zeiss Meditec AG. U.S. Pat. No. 4,786,155 has disclosed an optics system of the type set forth at the outset. This optics system is arranged in an operating microscope, which has a device for visualizing structures in the object region by means of light with a wavelength $\lambda \leq 620$ nm. The human eye has comparatively low sensitivity for light at this wavelength. However, this light is only scattered or absorbed a little by the arterial blood in the human body. The operating microscope contains an illumination device, by means of which it is possible to provide light lying in the red and infrared spectral range. In the operating microscope, there is a beam splitter on the side of an afocal magnification system facing away from the object region, above the microscope main objective in the left-hand and right-hand observation beam path, which beam splitter guides the observation light to a camera, by means of which light in the red and infrared spectral range can be detected. The optics system in the operating microscope contains a first optical assembly with an afocal magnification system. This optics system has a second optical assembly, which has the function of an objective and which guides a beam path, which passes through the first optical assembly, from an object region to the image sensor of the camera.

In surgical or operating microscopes, it is desirable, in particular for examining structures in an object region with fluorescing dyes, for an image acquisition system to be able to register not only the visible light but also light from the infrared spectral range.

To this end, conventional operating microscopes have an image acquisition system with different cameras, which are tuned to the visible and infrared spectral ranges (see, for example, DE 10 2006 006 014 A1).

SUMMARY OF THE INVENTION

It is an object of the invention to provide an optics system which is suitable for use in a surgical microscope and with which the image of the object region can be guided to an image acquisition system with good imaging quality not only in the visible but also in the infrared spectral range in the case of the same object distance, that is, in the case of one and the same distance between the optics system and the object region.

The optical system of the invention is for imaging an object region via an optical beam path in an image plane of an image acquisition system. The optical system includes: a first optical assembly configured to pass the optical beam path therethrough; the first optical assembly having an end facing away from the object region; a second optical assembly arranged in the optical beam path at the end of the first optical assembly; and, the second optical assembly defining a system configured to at least partially compensate chromatic longitudinal aberrations of the first optical assembly occurring in a wavelength range of light of 625 nm$\leq \lambda \leq$850 nm.

The invention rests on the concept of the optical assemblies used in surgical microscopes, especially optical assemblies with a microscope main objective and with a zoom system, generally being achromats. What this ensures is that the focal deviation for light with a wavelength lying in the red wavelength range ($\lambda \approx 640$ nm) and for light with a wavelength lying in the blue wavelength range ($\lambda \approx 480$ nm) is less than or equal to the depth of field $\delta = n\lambda/2NA^2$ of the optical assembly pursuant to the standard ISO/FDIS 19012-2, where n is a refractive index of the medium in the object space (in air, n=1 applies), NA is the object-side numerical aperture and $\lambda = 480$ nm or $\lambda = 640$ nm.

However, such achromats have a significant longitudinal and transverse chromatic aberration in respect of the wavelengths, specified above, for the light lying in the infrared spectral region, for example, for light with a wavelength $\lambda = 850$ nm.

In order to reduce this longitudinal and transverse chromatic aberration, the invention proposes that the second optical assembly in the optics system is embodied as a system at least partly compensating longitudinal chromatic aberrations of the first optical assembly occurring in the wavelength range 625 nm$\leq \lambda \leq$850 nm of the light. What can be achieved by this measure is that the object region can also be examined by means of the optics system using light lying in the near infrared and in the infrared spectral range, without optical components in the optics system needing to be adjusted on long displacement paths for this purpose. In particular, what can be achieved by this measure is that changing the distance between the optics system and the object region or refocusing the optics system does not lead to the image of the object region supplied to the image acquisition system losing sharpness in the wavelength range 625 nm$\leq \lambda \leq$850 nm of the light in relation to an image of the object region with light lying in the visible spectral range.

Here, the second optical assembly in the optics system can have positive refractive power. In particular, the second optical assembly can be an objective, for example an objective for a color camera, which brings about imaging of the object region in the image plane of the image acquisition system.

By virtue of the second optical assembly containing at least one lens displaceable in the optical beam path relative to the image plane of the image acquisition system, it is possible to compensate errors of the imaging in the image plane of the image acquisition system, which errors are dependent on the wavelength of the light used to observe the object region.

In order to compensate errors of the imaging in the image plane of the image acquisition system, which errors are dependent on the wavelength of the light used to observe the object region, it is also possible, within the optics system, to provide a displaceability of the second optical assembly as a whole for the purposes of setting the optical path length of the optical beam path from the object region into the image plane of the image acquisition system.

According to the invention, the second optical assembly can have a first lens with positive refractive power and a second lens with negative refractive power and a third lens with positive refractive power. Here, the first lens with positive refractive power and the second lens with negative refractive power can be combined to form a cemented member. The first lens of the second optical assembly then faces, where possible, the first optical assembly in the optical beam path. Here, the third lens of the second optical assembly is preferably arranged in the optical beam path on the side facing the image plane of the image acquisition system. Here, the two lenses with positive refractive power preferably consist of a material with anomalous partial dispersion.

The glasses of the lenses with positive refractive power in the second optical assembly of an optics system according to the invention respectively lie away from the so-called normal line.

According to the invention, the two lenses with positive refractive power, in particular, can consist of the glasses N-FK58, N-FK51A, N-PK52A, N-PK51 from Schott, the glasses S-FPL53, S-FPL-51, S-FPL51Y, S-FPM3 or else S-FPM2 from Ohara, or glasses which have optical properties corresponding to the optical properties of the aforementioned glasses and an anomalous relative partial dispersion.

The lens with negative refractive power in the second optical assembly advantageously consists of a material with a lower Abbe number but with a relative partial dispersion which is as similar as possible to the one occurring in the positive lenses. In an optics system according to the invention, the lens with a negative refractive power in the second optical assembly can consist, in particular, of the glass N-KZFS2, N-BK7 or N-SK11.

Advantageous glass combinations, in the second optical assembly, for the two lenses with positive refractive power on the one hand and the lens with negative refractive power on the other hand are in particular: S-FPL51/N-KZFS2, S-FPL53/N-BK7 or N-PK51/N-SK11. The glasses of the lens with negative refractive power in the second optical assembly in an optics system according to the invention can have anomalous partial dispersion, but this is not mandatory. The glasses of the lens with negative refractive power in the second optical assembly in an optics system according to the invention can therefore also lie in the vicinity of the normal line.

In particular, the invention proposes that the differences of the partial dispersions of the two glass types $\Delta P_{dC}$ and the differences of the Abbe numbers of the two glass types $\Delta v$ are related to one another in a ratio $|\Delta P_{dC}/\Delta v|$, for which $|\Delta P_{dC}/\Delta v| \leq 0.1‰$, preferably $|\Delta P_{dC}/\Delta v| \leq 0.03‰$ applies.

The first optical assembly in the optics system is an achromatic system preferably corrected for the light with the wavelength $\lambda \approx 656$ nm and the light with the wavelength $\lambda \approx 486$ nm. However, the first optical assembly can also be an apochromatic system, which is preferably corrected for the light with the wavelength $\lambda \approx 656$ nm and the light with the wavelength $\lambda \approx 486$ nm and the light with the wavelength $\lambda \approx 588$ nm. In particular, the first optical assembly can contain an afocal zoom system.

According to the invention, the second optical assembly in the optics system is an apochromat preferably corrected for the light with the wavelength $\lambda \approx 486$ nm, $\lambda \approx 588$ nm and $\lambda \approx 656$ nm or a semi-apochromat.

The invention understands a semi-apochromat to be an optics system with a positive refractive power, in which the focal deviation for light with a wavelength lying in the red wavelength range ($\lambda \approx 640$ nm) and for light with a wavelength lying in the blue wavelength range ($\lambda \approx 480$ nm) and for light with a wavelength lying in the green wavelength range ($\lambda \approx 546$ nm) is less than or equal to 2.5-times the depth of field $\delta = n\lambda/2NA^2$ pursuant to the standard ISO/FDIS 19012-2, where n is the refractive index of the medium in the object space, NA is the object-side numerical aperture and $\lambda \approx 480$ nm or $\lambda \approx 546$ nm or $\lambda \approx 640$ nm.

The invention understands an apochromat to be an optics system with a positive refractive power, in which the focal deviation for light with a wavelength lying in the red wavelength range ($\lambda \approx 640$ nm) and for light with a wavelength lying in the blue wavelength range ($\lambda \approx 480$ nm) and for light with a wavelength lying in the green wavelength range ($\lambda \approx 546$ nm) is less than or equal to the depth of field $\delta = n\lambda/2NA^2$ pursuant to the standard ISO/FDIS 19012-2, where n is the refractive index of the medium in the object space, NA is the object-side numerical aperture and $\lambda \approx 480$ nm or $\lambda \approx 546$ nm or $\lambda \approx 640$ nm.

The invention also extends to a surgical microscope containing an optics system as specified above. It is advantageous if the surgical microscope has a color camera embodied as a 3-chip camera, with image sensors arranged in the image plane of the image acquisition system. This renders it possible to use the color camera to register the object region of the surgical microscope with light, the wavelength of which lies in the visible and infrared spectral range. The invention also extends to a surgical microscope with an illumination device, which provides an illumination beam path, which serves to excite the fluorescence of a dye in the object region and which can be guided through a filter system for filtering-out light, the wavelength of which corresponds to the wavelength of the fluorescent light of the fluorescing dye, which is then detected by the camera in the surgical microscope.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
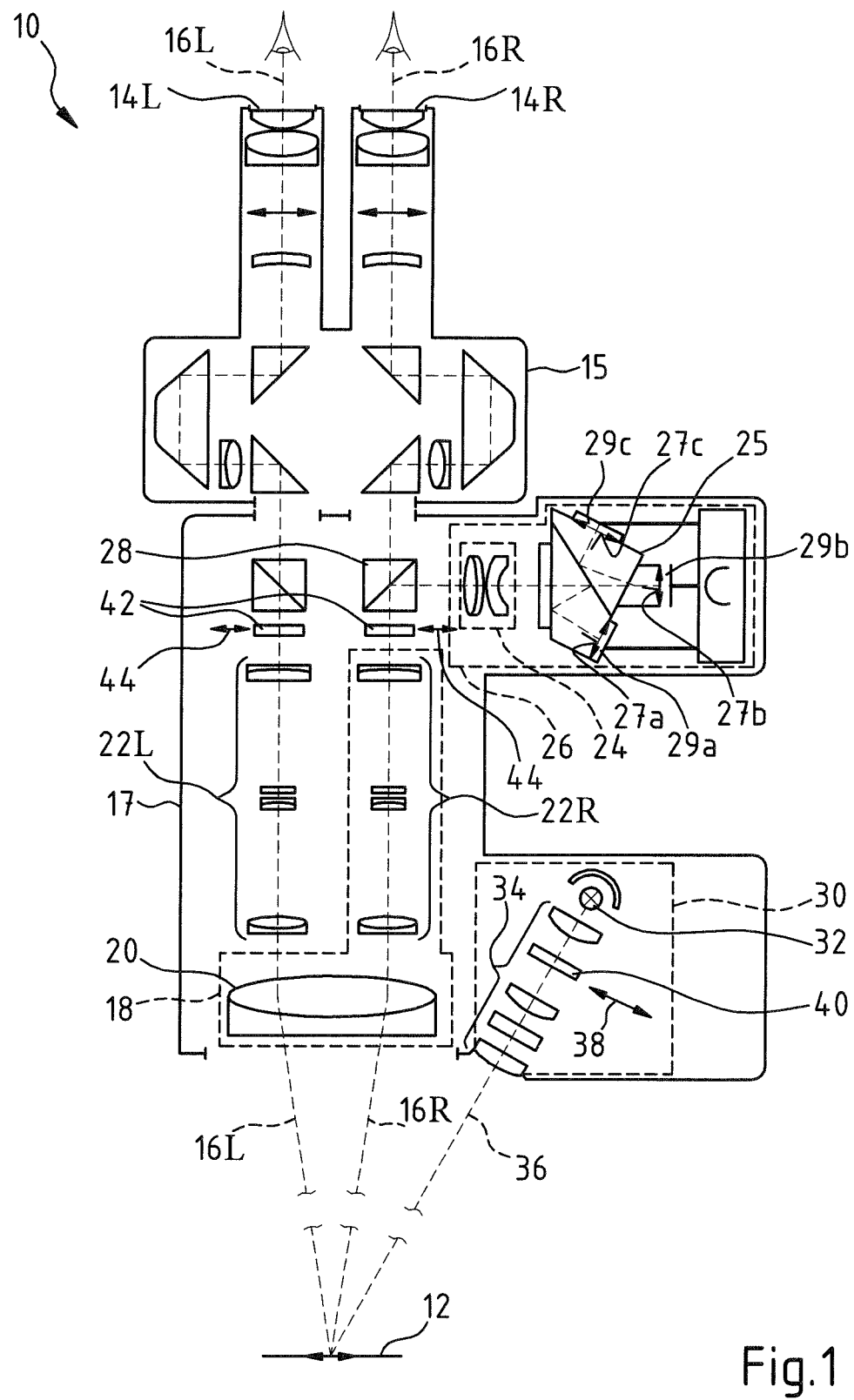
FIG. 1 shows a surgical microscope with an optics system for visualizing an object region in eyepieces and imaging of the object region in an image plane of an image acquisition system with an optical beam path.

The surgical microscope 10 shown in FIG. 1 enables an observer to observe, with magnification, an object region 12 in a left-hand and right-hand eyepiece (14L, 14R) of a binocular tube 15 with a stereoscopic optical beam path (16L, 16R). In the surgical microscope 10, the light from the object region 12 is guided through an optics system which contains, arranged in a microscope main body 17, a first optical assembly 18 with a microscope main objective system 20 and an afocal zoom system 22R and which has a second optical assembly 24, which acts as the camera objective of an image acquisition system in the form of a color camera 26 with image planes (27a, 27b, 27c), to which the light is guided from the beam path 16R by means of a beam splitter 28. In the image planes (27a, 27b, 27c) of the color camera 26 there are a splitter prism arrangement 25 and different image sensors (29a, 29b, 29c) which serve to register the different light lying in the red, green and blue spectral ranges. The image sensor 29a configured for registering light in the red spectral range also enables the registration of light with a wavelength lying in the near infrared and infrared spectral ranges, that is, light with a wavelength in the range from 0.7 μm to 5 μm and light with a wavelength of 5 μm to 50 μm.

As an alternative to the above, it is also possible especially to configure the splitter prism arrangement 25 in such a way that the image sensor 29c, which is configured for registering light in the blue spectral range, can also register the light with wavelengths in the near infrared and infrared spectral ranges.

The observation beam path 16L in the surgical microscope passes through a zoom system 22L which corresponds to the configuration of the zoom system 22R.

The surgical microscope 10 is accommodated on a stand (not shown here), which has adjustable articulated arms. On the stand, the surgical microscope 10 can be displaced over the object region 12 by adjusting the articulated arms.

The surgical microscope 10 contains an illumination device 30 with a light source 32 and illumination optics 34, through which the light from the light source 32 can pass. The illumination optics provide an illumination beam path 36 via which the object region 12 can be illuminated.

The illumination device 30 is configured to excite one or more dyes, such as, for example, indocyanine green (ICG) dye, 5ALA dye or protoporphyrin IX dye, to fluoresce. To this end, light having a wavelength in the blue spectral range is provided by the light source 32 of the illumination device 30. In order to prevent light having a wavelength corresponding to the wavelength of the light of the dye, which is excited to fluoresce and arranged in the object region 12, from being guided in the illumination beam path 36 to the object region 12, there is a fluorescence excitation filter 40 in the illumination device 30. The fluorescence excitation filter can be introduced into the illumination beam path 36 in accordance with the double-headed arrow 38 so as to filter out the spectral range of the illumination light which is released when a dye in the object region 12, which is excited to fluoresce, fluoresces.

So that only the fluorescent light released by a fluorescing dye in the object region 12 can be guided to an observer and the color camera 26 in the fluorescence operating mode of the surgical microscope 10, the optics system in the surgical microscope 10 contains adjustable filter elements 42 which, in accordance with the double-headed arrow 44, can be arranged in the stereoscopic observation beam paths (16L, 16R) on the end of the zoom systems facing away from the object region. The filter elements 42 can ensure that the light with the wavelength of the light exciting the fluorescence does not reach the eyepieces (14L, 14R) of the binocular tube 15 and the color camera 26.

Figure 2:
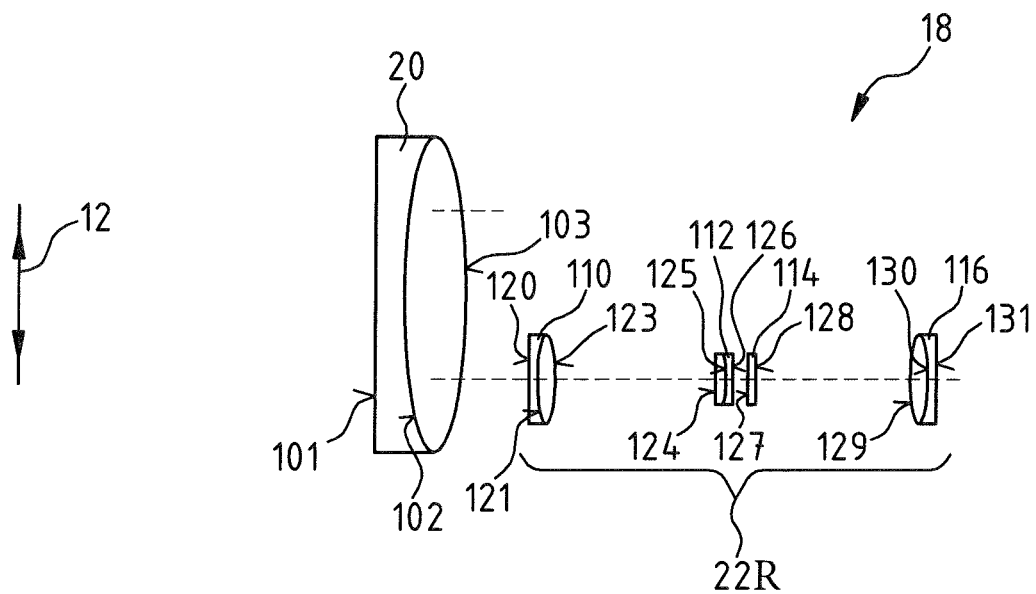
FIG. 2 shows a first optical assembly in the optics system of the surgical microscope, which contains a microscope main objective system and an afocal zoom system.

FIG. 2 shows the first optical assembly 18 in the optics system of the surgical microscope 10. The microscope main objective system 20 is a cemented member with the optically effective surfaces 101, 102 and 103. The afocal zoom system 22R has four members (110, 112, 114, 116.) The members (110, 116) of the zoom system 22R have positive refractive power and are in each case configured as cemented members. The members (112, 114) in the afocal zoom system 22R are arranged so as to be displaceable. Here, the member 112 is likewise embodied as a cemented member. The zoom system 22R has the optically effective surfaces (120, 121, 123, 124, 125, 126, 127, 128, 129, 130 and 131).

The optical assembly 18 is an achromat which completely compensates the longitudinal chromatic aberration CHL of the wavefront for the light with the wavelength λ=486 nm (F-line) in relation to the light with the wavelength λ=656 nm (C-line), that is, $CHL^{18}_{FC}=0$.

Figure 3:
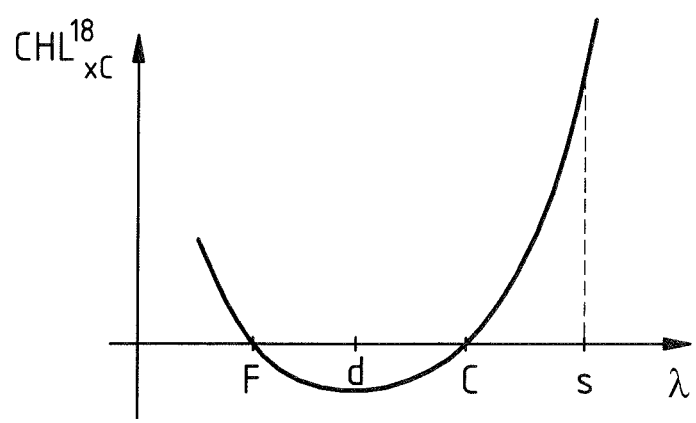
FIG. 3 shows a longitudinal chromatic aberration of this first optical assembly in the optics system of the surgical microscope, which longitudinal chromatic aberration is dependent on the wavelength $\lambda$ of the light.

FIG. 3 shows the longitudinal chromatic aberration $CHL^{18}_{xC}$, related to the C-line and dependent on the wavelength λ of the light (x-line), of this first optical assembly in the optics system of the surgical microscope.

The configuration of the optics system in the surgical microscope 10 is based on the consideration that the longitudinal chromatic aberration $CHL^{18}_{xC}$, related to the C-line and dependent on any wavelength of the light (x-line), of the wavefront in relation to the C-line can be estimated to a good approximation as follows:

$$CHL^{18}_{xC} = \alpha_{xC} \cdot \sum_i \frac{1}{2} y_i^2 \cdot \varphi_i + \sum_i \beta_{xC,i} \cdot \frac{1}{2} y_i^2 \cdot \frac{\varphi_i}{v_i}$$

where $\alpha_{xC}$ denotes the gradient of the normal line related to the C-line for the light with a wavelength x, $\beta_{xC,i}$ denotes the distance of a specific glass of a lens i from this normal line, $y_i$ denotes the marginal ray height, $v_i$ denotes the Abbe numbers of the materials $v=(n_d-1)/(n_F-n_C)$, and $\varphi_i$ denotes the refractive powers of the lenses i.

The inventors discovered that, if only normal glasses are used in the optical assembly 18 for achromatization (that is, $\beta_{xC,i}=0$), the chromatic longitudinal aberrations, related to the C-line, for the light with a wavelength λ=588 nm (d-line) and λ=850 nm (s-line), with $$CHL^{18}_{dC}=\alpha_{dC}\cdot\Sigma_i \frac{1}{2}y_i^2\cdot\varphi_i \quad \alpha_{dC}=+0.00046173$$

$$CHL^{18}_{sC}=\alpha_{sC}\cdot\Sigma_i \frac{1}{2}y_i^2\cdot\varphi_i \quad \alpha_{sC}=-0.002304493$$

are related to one another as follows:

$$\frac{CHL_{sC}}{CHL_{dC}} = \frac{\alpha_{sC}}{\alpha_{dC}} \approx -5$$

That is, the chromatic aberrations for the light in the near infrared and in the infrared are approximately 5-times larger than in the visible spectral range in the optical assembly 18; the sign of these chromatic aberrations is, however, opposite to the sign of the chromatic aberrations in the visible spectral range.

The second optical assembly 24 in the optics system of the surgical microscope 10 serves to reduce the chromatic aberration of the image of the object region, supplied to the color camera 26, in the near infrared and in the infrared.

This is achieved by virtue of the chromatic aberrations of the optics group 24 being completely compensated for simultaneously, preferably for light with the wavelength λ=656 nm (C-line), λ=588 nm (d-line) and λ=486 nm (F-line). This is because the chromatic aberration of the optical assembly 24 for the wavelength λ=850 nm (s-line) then has the opposite sign to the corresponding chromatic aberration of the optical assembly 18. As a consequence, the chromatic aberration in the near infrared and in the infrared of the optical assembly 18 is at least partly lifted by the chromatic aberration of the optical assembly 24 in the near infrared and infrared. Since the optical assembly 18 and the optical assembly 24 are in each case completely compensated for the light in the visible spectral range, the combination of the optical assembly 18 with the optical assembly 24 in the optics system of the surgical microscope 10 can supply the color camera 26 with an image which does not have any chromatic aberrations in the visible spectral range either.

Figure 4:
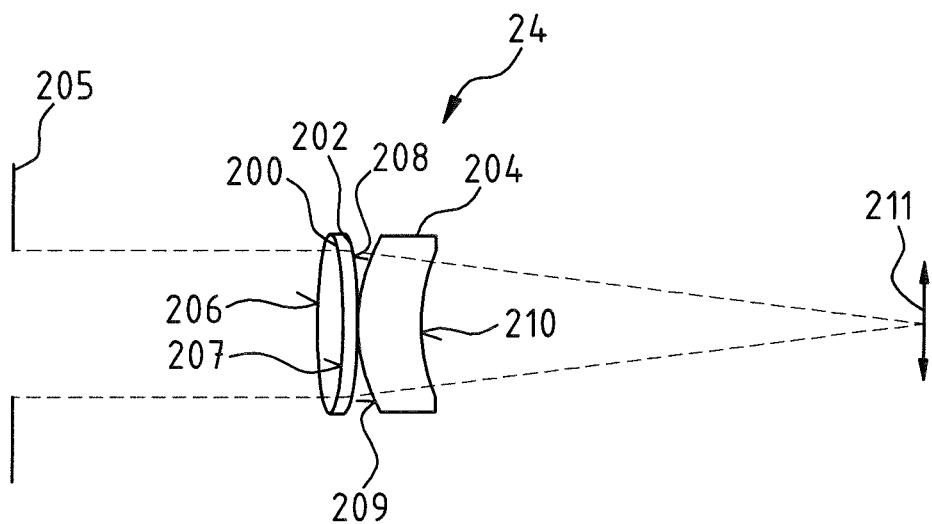
FIG. 4 shows a second optical assembly embodied as a camera objective in the optics system of the surgical microscope.

FIG. 4 shows the second optical assembly 24 in the optics system of the surgical microscope 10. The optical assembly 24 has a positive refractive power. It contains three lenses 200, 202 and 204. The lenses (200, 202) form a cemented member with positive refractive power. The refractive power of the lens 204 is positive. The lenses 200 and 204 consist of a lens material, the partial dispersion of which is anomalous in the visible spectral range. The lens 202 in the cemented member consists of one of the materials mentioned above, which fits with the material of the positive lenses. The optical assembly 24 has the optically effective surfaces 206, 207, 208, 209 and 210. It is a two-member apochromat which, in relation to the light with the wavelength λ=656 nm (C-line), completely compensates the longitudinal chromatic aberration $CHL^{24}$ of the wavefront for the light with the wavelength λ=486 nm (F-line) and for the light with the wavelength λ=588 nm (d-line), that is, $CHL_{FC}^{24}=0$ and $CHL_{dC}^{24}=0$. This is ensured by the aforementioned glass selection.

Figure 5:
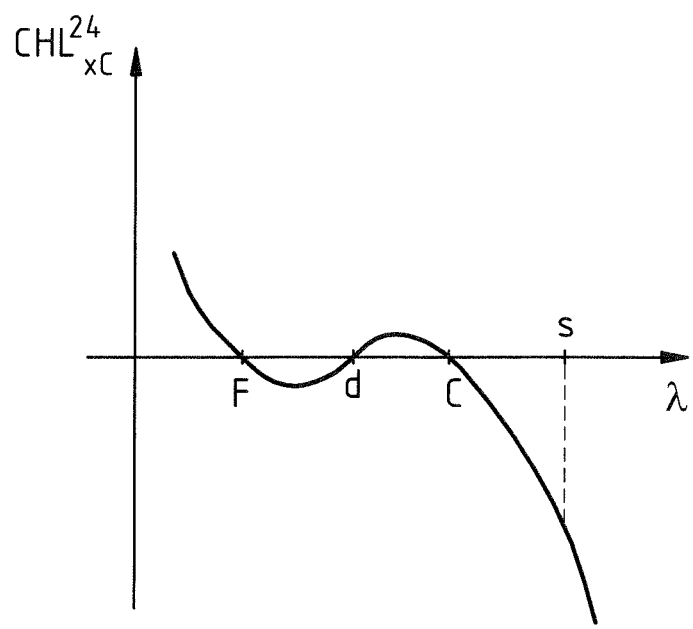
FIG. 5 shows a longitudinal chromatic aberration of the second optical assembly in the optics system, which longitudinal chromatic aberration is dependent on the wavelength λ of the light; and, FIG. 6 shows a resultant longitudinal chromatic aberration of the first and second optical assemblies as a function of the wavelength λ of the light.

FIG. 5 shows the longitudinal chromatic aberration $CHL_{xC}^{24}$, related to the C-line and dependent on the wavelength λ of the light (x-line), of this second optical assembly 24 in the optics system of the surgical microscope 10.

The inventors have discovered that the residual error of the two-member apochromat into the near infrared in the case of light with the wavelength λ=852 nm (s-line) can be estimated to a good approximation as follows:

$$CHL_{sC,Apo} = \frac{1}{2} \cdot y_0^2 \cdot \varphi \cdot \frac{\Delta P_{sC}}{\Delta v}$$

where $y_0$ is the marginal ray height and φ is the refractive power of the two-member apochromat. The variable $\Delta P_{sC}$ denotes the difference of the relative partial dispersions of the two employed glass types in the wavelength range between the s-line and the C-line, the variable Δv describes the difference in the Abbe numbers of the two glasses.

As can be gathered from the following table, the values of the variable $\Delta P_{sC}/\Delta v$ vary between +0.00051 and +0.00042 for some of the aforementioned glass pairs.

Table of values of the variable $\Delta P_{sC}/\Delta v$ for different glass pairs

| Glass pair | ΔP sC | Δv | ΔP/Δv sC |
|---|---|---|---|
| S-FPL51/N-KZFS2 | 0.01410 | 27.54 | 0.000512 |
| S-FPL53/N-BK7 | 0.01290 | 30.78 | 0.000419 |
| N-PK51/N-SK11 | 0.00760 | 16.18 | 0.000470 |

The variations of the values of the variable $\Delta P_{sC}/\Delta v$ for different glass types are used by the invention in order thereby to at least partly compensate the longitudinal chromatic aberration $CHL_{xC}$ of the first optical assembly 18 by way of a suitable selection of the glass types of the lenses (200, 202, 204) in the optical assembly 24. To this end, an allowance with a sign opposite to the sign of the longitudinal chromatic aberration of the first optical assembly is set for the longitudinal chromatic aberration of the second optical assembly in the infrared spectral range.

Figure 6:
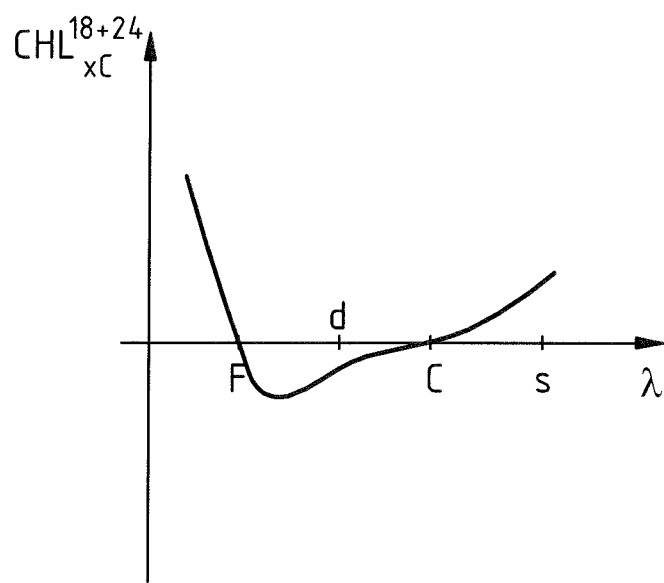

FIG. 6 shows the resultant longitudinal chromatic aberration $CHL_{xC}^{18+24}$ of the first optical assembly 18 and second optical assembly 24 depending on the wavelength λ of the light.

Therefore, in the optics system of the surgical microscope 10, the second optical assembly 24 compensates the longitudinal chromatic aberration of the first optical assembly 18 except for a residual error, which does not have an effect for the imaging of the object region 12 on the image sensor of the camera with light in the infrared spectral range.

A configuration example for the first optical assembly 18 and the second optical assembly 24 in the optics system of the surgical microscope 10 is reproduced in the following tables:

Table Optical Assembly 18

| Optically effective surface | Radius r/mm | Thickness or air gap d/mm | Free diameter $d_F$/mm | Medium (glass type) |
|---|---|---|---|---|
| 12 | Object | 195.154 | 25 | AIR |
| 101 | 187.4 | 2 | 25 | BAF3 |
| 102 | 75.6 | 8 | 25 | CAF2 |
| 103 | −111.5 | 12.407 | | AIR |
| 120 | 32.181 | 1.2 | 12 | S-NBH8 |
| 121 | 16.404 | 2.2 | 12 | S-PHM53 |
| 123 | −180.98 | 0.986 | 12 | AIR |
| 124 | −19.376 | 1.4 | 7 | N-SF6 |
| 125 | −9.183 | 1 | 7 | N-SK16 |
| 126 | 41.591 | 1.6 | 7 | AIR |
| 127 | −41.591 | 1 | 7 | N-SK16 |
| 128 | 41.591 | 29.808 | 7 | AIR |
| 129 | 180.98 | 2.2 | 12 | S-PHM53 |
| 130 | −16.404 | 1.2 | 12 | S-NBH8 |
| 131 | −32.181 | 2 | | AIR |

Table Optical Assembly 24

| Optically effective surface | Radius r/mm | Thickness or air gap d/mm | Free diameter $d_F$/mm | Medium (glass type) |
|---|---|---|---|---|
| 205 | Pupil | 10-60 | 12 | AIR |
| 206 | 33.978 | 3 | 12 | S-FPL51 |
| 207 | −18.260 | 1.5 | 12 | N-KZFS2 |
| 208 | 56.630 | 0.1 | 12 | AIR |
| 209 | 25.489 | 2 | 12 | S-FPL51 |
| 210 | 732.328 | 46.65 | 12 | AIR |
| 211 | Image | | | |

Here, the following applies:

| Medium (glass type) | Refractive index ne at 546 nm | Abbe number ve at 546 nm |
|---|---|---|
| BAF3 | 1.585650 | 46.17 |
| CAF2 | 1.434966 | 94.69 |
| S-NBH8 | 1.725384 | 34.47 |
| S-PHM53 | 1.605199 | 65.15 |
| N-SF6 | 1.812659 | 25.16 |
| N-SK16 | 1.622863 | 60.08 |
| S-FPL51 | 1.498454 | 81.14 |
| N-KZSF2 | 1.560823 | 53.83 |
| AIR | 1 | — |

It should be noted that, in principle, as lens material for the lenses with anomalous partial dispersion in the second optical assembly, use can also be made of glasses N-FK58, N-FK51A, N-PK52A, N-PK51 from Schott, the glasses S-FPL53, S-FPL-51, S-FPL51Y, S-FPM3 or else S-FPM2 from Ohara, or glasses which have optical properties corresponding to the optical properties of the aforementioned glasses and an anomalous partial dispersion.

It should be noted that, in principle, the microscope main objective system 20 in the above-described surgical microscope 10 can also be embodied as a focusable microscope main objective. The configuration of the optical assembly 24 according to the table reproduced above ensures that an image of the object region 12 is respectively generated even when focusing the microscope main objective in the image planes 27a, 27b and 27c, which image does not lose sharpness only for light in the visible spectral range but does not lose sharpness for the light in the near infrared either, without this requiring a displacement in the beam path 16R of the optical assembly 24 as a whole or of the lenses in this optical assembly.

In conclusion, the following, in particular, should be registered: The invention relates to an optics system for imaging an object region 12 with an optical beam path (16R, 16R') in an image plane (27a, 27b, 27c) of an image acquisition system. The optics system contains a first optical assembly 18, through which the optical beam path 16R passes, and a second optical assembly 24 arranged in the optical beam path 16R on the side of the first optical assembly 18 facing away from the object region 12. The second optical assembly 24 is embodied as a system at least partly compensating longitudinal chromatic aberrations of the first optical assembly 18 occurring in the wavelength range 625 nm≤λ≤850 nm of the light.

It is understood that the foregoing description is that of the preferred embodiments of the invention and that various changes and modifications may be made thereto without departing from the spirit and scope of the invention as defined in the appended claims.

LIST OF REFERENCE SIGNS

10 Surgical microscope
12 Object region
14L Left-hand eyepiece
14R Right-hand eyepiece
15 Binocular tube
16L Left-hand beam path
16R Right-hand beam path
16R' Right-hand beam path
17 Microscope main body
18 First optical assembly
20 Microscope main objective system
22L, 22R Zoom system
24 Second optical assembly
25 Splitter prism arrangement
26 Color camera
27a, b, c Image planes
28 Beam splitter
29a, b, c Image sensors
30 Illumination device
32 Light source
34 Illumination optics
36 Illumination beam path
38 Double-headed arrow
40 Fluorescence excitation filter
42 Filter element
44 Double-headed arrow
101, 102, 103 Optically effective surface
110, 112, 114, 116 Member
120, 121, 123, 124, 125,
126, 127, 128, 129, 130, 131 Optically effective surface
200, 202, 204 Lens
205 Pupil
206, 207, 208, 209, 210 Optically effective surface
211 Image

What is claimed is:
1. A surgical microscope comprising:
an image acquisition system defining an image plane;
an optical system defining an optical beam path and being configured for imaging an object region into said image plane via said optical beam path;
said optical system including a first optical assembly mounted in said optical beam path so as to permit said optical beam path to pass therethrough;
said first optical assembly having an end facing away from said object region;
said optical system further including a second optical assembly mounted in said optical beam path at said end of said first optical assembly;
said second optical assembly being configured as a compensation system to at least partially compensate for longitudinal chromatic aberrations of said first optical assembly occurring in a wavelength range of light of 625 nm≤λ≤850 nm;
said first optical assembly being configured as an achromatic system corrected for the light of a first wavelength and a second wavelength;
said first wavelength being preferably λ≈486 nm and said second wavelength being preferably λ≈656 nm;
said achromatic system including lenses made exclusively of normal or standard glasses to provide achromatization with said normal or standard glasses having chromatic aberrations for light in the near infrared and infrared which are approximately five times larger than chromatic aberrations in the visible spectral range;

the chromatic aberrations in the near infrared and infrared having a sign opposite to the sign of the chromatic aberrations in the visible spectral range; and, said second optical assembly being an apochromat or semi-apochromat corrected for the light of said first wavelength, which is preferably λ≈486 nm, and for the light of said second wavelength, which is preferably λ≈656 nm, as well as the light of a third wavelength which is preferably λ≈588 nm to reduce the chromatic aberration in the near infrared and infrared of the image of the object region supplied to said image acquisition system.

2. The surgical microscope of claim 1, wherein:

said second optical assembly has a first lens of positive refractive power, a second lens of negative refractive power and a third lens of positive refractive power;

said first lens being made from a first glass material and said second lens being made from a second glass material and said third lens being made from said first or a third glass material; wherein the differences $\Delta P_{dc}$ of partial dispersions of said first glass material or of the third glass material in relation to the partial dispersion of the second glass material and the differences $\Delta v$ of the Abbe numbers of said first glass material or said third glass material in relation to the Abbe number of said second glass material are related to one another in a ratio $|\Delta P_{dc}/\Delta v|$, for which $|\Delta P_{dc}/\Delta v| \leq 0.1‰$ applies.

3. The surgical microscope of claim 2, wherein:

said differences $\Delta P_{dc}$ of partial dispersions of said first glass material or of said third glass material in relation to the partial dispersion of said second glass material and the differences $\Delta v$ of the Abbe numbers of said first glass material or said third glass material in relation to the Abbe number of said second glass material are related to one another in a ratio of $|\Delta P_{dc}/\Delta v|$ for which $|\Delta P_{dc}/\Delta v| \leq 0.03‰$ applies.

4. The surgical microscope of claim 2, wherein:

said first lens of positive refractive power and said second lens of negative refractive power are combined to form a cemented member; and/or, said first lens of said second optical assembly is mounted at the end thereof facing toward said first optical assembly in said optical beam path; and/or, said third lens of said second optical assembly is mounted so as to face toward said image plane of said image acquisition system in said optical beam path.

5. The surgical microscope of claim 2, wherein said first lens of said second optical assembly and/or said third lens of said second optical assembly are made of a lens material which has anomalous partial dispersion.

6. The surgical microscope of claim 1, wherein said first optical assembly includes an afocal zoom system.

7. The surgical microscope of claims 1, wherein said second optical assembly has a positive refractive power.

8. The surgical microscope of claim 1, wherein said second optical assembly is an objective effecting an imaging of said object region into said image plane of said image acquisition system.

9. The surgical microscope of claim 1, wherein said second optical assembly has at least one lens displaceable in said optical beam path relative to said image plane of said image acquisition system.

10. The surgical microscope of claim 9, wherein said second optical assembly is displaceably mounted so as to permit adjustment of the optical wavelength of said optical beam path from said object region into said image plane of said image acquisition system.

11. The surgical microscope of claim 1, wherein said image acquisition system includes a color camera configured as a three-chip camera; and, a plurality of image sensors arrayed in said image plane of said image acquisition system.

12. The surgical microscope of claim 11, further comprising an illumination unit defining an illumination beam path for exciting fluorescence of a dye in said object region; and, including a filter system for filtering out light having a wavelength corresponding to the wavelength of the fluorescence light of the fluorescing dye.

* * * * *